March 16, 1965 H. H. L. RITZ 3,173,845
FUEL ELEMENTS FOR NUCLEAR REACTORS
Filed May 20, 1958 2 Sheets-Sheet 1
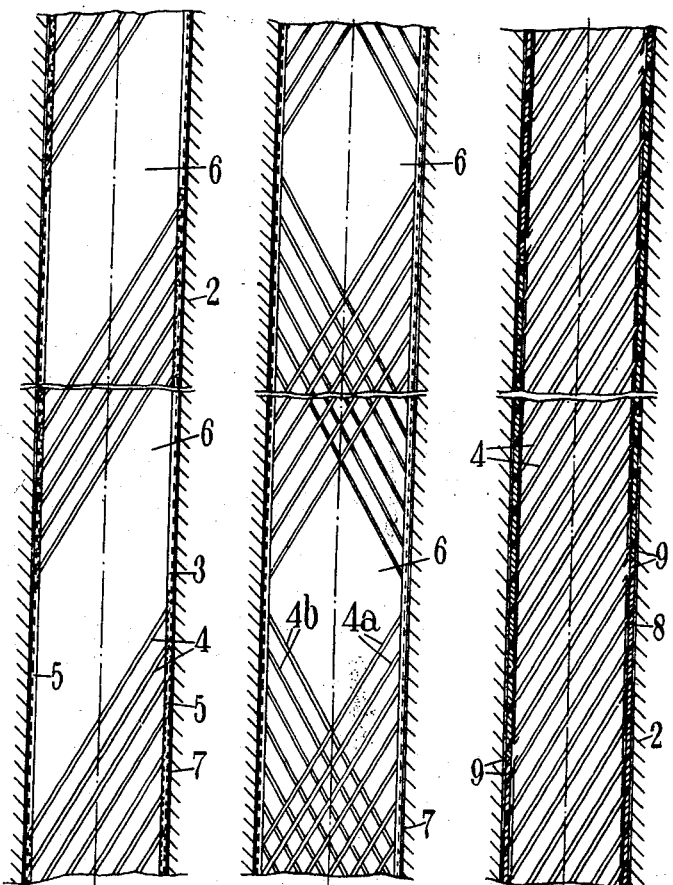
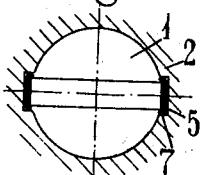
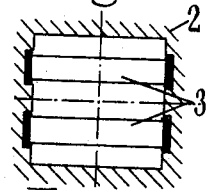
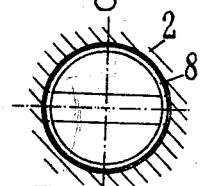

March 16, 1965        H. H. L. RITZ        3,173,845
FUEL ELEMENTS FOR NUCLEAR REACTORS
Filed May 20, 1958        2 Sheets-Sheet 2
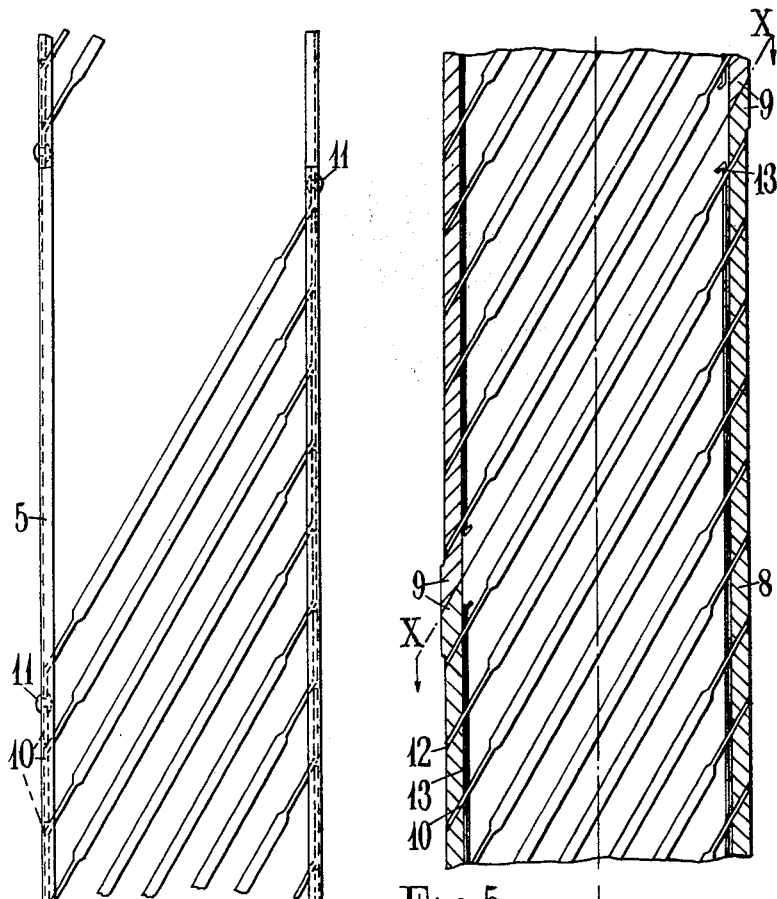
Fig.4    Fig.5
Fig.4a    Fig.5a
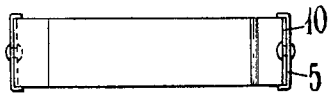

United States Patent Office 3,173,845
Patented Mar. 16, 1965

3,173,845
FUEL ELEMENTS FOR NUCLEAR REACTORS
Heinrich Hugo Ludolf Ritz, Newcastle-upon-Tyne, England, assignor to C. A. Parsons & Company Limited
Filed May 20, 1958, Ser. No. 736,580
Claims priority, application Great Britain, May 21, 1957, 16,136/57
8 Claims. (Cl. 176—50)

This invention relates to fuel elements for nuclear reactors in which reactors nuclear fuel is enclosed in a container over the surface of which a cooling fluid is passed for the purpose of removing heat generated in the nuclear fuel during operation of the reactor.

One form of the above type of reactor is the graphite moderated gas cooled reactor in which solid nuclear fuel is located in containers which are housed in a plurality of channels in a core of graphite, a cooling gas being circulated through the channels to cool the nuclear fuel. It is common practice in this form of reactor to use fuel rods of natural uranium housed in containers of a low neutron absorbing material such as a magnesium alloy.

One of the major problems involved is to obtain the maximum amount of heat transfer from the uranium to the cooling gas for a given pressure drop along the channel and to do this it is desirable to keep the temperature drop between the central portion of the fuel rod and its outer surface to a minimum and to provide as large a heat transfer surface as possible.

With the rod type of fuel element the heat transfer surface has been increased by the use of fins on the magnesium alloy container, but because of the bad conductivity of the uranium the temperature drop across the cross section of the fuel itself is always appreciable.

In order to overcome this latter drawback it has been proposed to dispose the uranium in plate form rather than rod form.

We have found that in the conventional rod form of fuel element the heat transfer is further improved by making the finned surface in such a way as to produce a vortex type of flow over the surface and we described in our co-pending application No. 618,258 a form of fuel element in which this type of flow was produced.

Briefly the fuel element consisted of a rod of nuclear fuel housed in a container which had fins disposed in helical fashion with respect to the longitudinal axis of the container. Interrupting the spaces between the fins were a series of baffles or splitters which extended axially for the length of the element and radially beyond the tips of the helical fins. When the fuel element was located in a channel in the reactor these baffles extended to a position radially close to the moderating material. The resulting flow was one in which the cooling gas tended to follow a helical path about an axis which was itself a helix.

With the plate type of fuel element this fin arrangement is not practicable.

The object of the present invention is to provide a fuel element having the following two features, namely, (1) it is of the type in which the nuclear fuel is housed in containers of plate form and; (2) it is one in which a flow effect of the kind described is induced.

The invention consists in a fuel element for a nuclear reactor which fuel element comprises a plurality of plates each containing nuclear fuel, the plates being held in fixed relation to, but spaced from, each other in such a way that when the element is in position in a cooling channel in the reactor they are inclined to the longitudinal axis of the channel, the dimensions of the plates being such that when the element is in position a cooling fluid can flow in the direction of the longitudinal axis of the channel and between the said plates.

The invention also consists in a fuel element for a nuclear reactor in accordance with the preceding paragraph in which the plates are held in fixed relationship to one another by means of two pillars, each end of a plate being fixed to a pillar.

The invention also consists in a fuel element for a nuclear reactor in accordance with the preceding paragraph in which the pillars are of channel section and fit into channel formed in the moderator, the plates having their edges bent in opposite directions parallel to the pillars so that they can rest on each other and lie parallel to each other in the channel, the uppermost and lowermost plates being joined to the pillars.

The invention also consists in a fuel element for a nuclear reactor in accordance with either of the two preceding paragraphs in which the two pillars of an element are of equal length but displaced from each other in the direction of the axis of the channel so that when several elements are stacked one on the other in a channel the spacing of the plates is uniform over the length of the channel.

The invention also consists in a fuel element for a nuclear reactor in accordance with the first of the preceding four paragraphs in which the plates are located in a tube, each plate being attached to the tube.

The invention also consists in a fuel element for a nuclear reactor in accordance with the preceding paragraph in which the ends of the tube are cut at an oblique angle parallel to the plates.

The invention also consists in a fuel element in accordance with either of the two preceding paragraphs in which the plates fit into slots in the tube and are held in position by wires extending longitudinally of the element.

The invention also consists in a fuel element in accordance with any of the three preceding paragraphs in which the tube is made of graphite.

The invention also consists in a fuel element in accordance with any of the preceding eight paragraphs in which flow takes place between the plates and the wall of the cooling channel.

The invention also consists in a fuel element or a plurality of fuel elements in accordance with any of the preceding nine paragraphs disposed in a fuel channel of a nuclear reactor.

The invention also consists in fuel elements for a nuclear reactor and their application in a nuclear reactor substantially as described herein.

Referring to the accompanying drawings:
FIGURE 1 is a view in section through part of a fuel channel in a reactor housing a fuel element in accordance with one form of the present invention;
FIGURE 1a is a plan view of FIGURE 1;
FIGURE 2 is a section through a fuel channel of square or oblong cross section housing two fuel elements of the kind shown in FIGURE 1;
FIGURE 2a is a plan view of FIGURE 2;
FIGURE 3 is a section through a fuel channel housing a fuel element in accordance with an alternative form of the invention;
FIGURE 3a is a plan view of FIGURE 3;
FIGURE 4 shows an enlarged section through the fuel element shown in FIGURES 1 and 2;
FIGURE 4a is a plan view of FIGURE 4;
FIGURE 5 is an enlarged section through the fuel element shown in FIGURE 3;
FIGURE 5a is a plan view on line XX of FIGURE 5 looking in the direction of the arrows.

In carrying the invention into effect in the forms illustrated by way of example and referring first to FIGURES 1 and 1a, a fuel channel 1 formed in a graphite reactor core 2 houses a fuel element 3 which is constructed in a form which may be considered as a ladder with oblique rungs. The oblique rungs of the ladder are formed by plates 4 which consist of nuclear fuel, for example, natural uranium, clad in a metal of low neutron absorption properties, for example, magnesium alloy, zirconium or beryllium, the metal forming a thin protective sheath for the fuel.

The uprights or posts of the ladder are formed by two members 5 of channel section and also made of metal of low neutron absorption.

The ends of the plates are turned over so that they can rest one on the other in the channels formed by the members 5 and yet be spaced from each other, the uppermost and lowermost plates being rivetted or otherwise joined to the members 5. The actual shape of the plates and the method of fixing can better be seen in FIGURES 4 and 4a which will be referred to again later.

The greater the angle of inclination of the plates the greater is the space 6 left between adjacent elements and containing no plates. In some cases this is no disadvantage, but in cases where it is undesirable the effect can be counteracted by staggering the fuel elements in adjacent fuel channels.

Alternatively the pillars of an element can be made of equal lengths but displaced from one another in the direction of the axis of the channel, so that when several elements are stacked one on the other in a channel the spacing of the plates is uniform over the length of the channel.

The effect of the construction of fuel element described on the flow of cooling fluid is to induce the fluid to flow in two paths, one on each side of the element. In each path the fluid flows in a helical path about an axis which is itself a helix. Considering a small mass of fluid each path carries the said mass in a helical path about a helical axis which passes between the plates and then into contact with the walls of the channel 1, still following a helical path and then between two further plates disposed further along the longitudinal axis of the element. The result is that the fluid proceeds progressively from one end of the element to the other following a helical path as described.

With such a flow pattern all parts of the fluid are being brought continuously into contact with the plates and the mean temperature of the fluid approximates closely the maximum temperature of the fluid, which is a desirable feature for good heat transfer.

In the form illustrated in FIGURES 2 and 2a two fuel elements 3 are arranged side by side in a fuel channel. The plates 4a in one element are disposed in the opposite sense to those 4b in the other element as can be seen from the figures.

In this arrangement the tendency is for the fluid to flow in one main helix the axis of which is between the elements.

Smaller helices will be set up between each element and a channel wall but these will be of a secondary nature. These secondary helices can be eliminated, if desired, by arranging the fuel elements along opposite walls of the channel.

In both FIGURE 1 and FIGURE 2 the fuel element is located in slots 7 formed in the graphite core.

In the form illustrated in FIGURES 3 and 3a the plates 4 are held in position, spaced apart from each other, by locating them in slots in a graphite tube 8.

The tubes 8 have shoulders 9 which space them from the main graphite core when they are in position in a fuel channel to permit a cooling gas to flow between the core and the graphite tube.

In order to avoid the occurrence of spaces such as those indicated at 6 in FIGURES 1 and 2 the graphite tubes are cut away at each end in a plane parallel to the planes on which the plates lie. The result is that when the elements are stacked one upon the other in the channel the spacing of the plates is the same over the whole length of the channel.

In FIGURE 3 parts of three adjacent elements are shown.

The fixing of the plates is achieved by wires passing through end portions of the plates as is more clearly shown in FIGURE 5.

The plates are constructed so that the nuclear fuel is contained only in that part of the plate which is disposed between the walls of the tube. A similar construction of plate is adopted in FIGURES 1 and 2 as is more clearly shown in FIGURE 4.

Referring to FIGURES 4 and 4a the edge portions of each plate contain no nuclear fuel and are consequently thinner than the portion containing the fuel. The edge portions 10 which fit into the channel of member 5 are bent in opposite directions to one another at an angle to the remainder of the plate. As a result the plates can rest one on top of the other in the channel of members 5.

To hold all the plates in position it is necessary to fix the uppermost and lowermost plates and this is achieved by rivets 11.

In FIGURES 5 and 5a the edge portions 10 of the plates fit into slots 12 in the graphite tube. The slots pass through the tube and to prevent each plate from moving in the slots, wires 13 are threaded through holes in the edge portions of the plates adjacent the wall of the graphite tube.

The orientation of the fuel elements within the channels can easily be adjusted to suit any particular pattern desired for nuclear considerations.

The fuel may be in liquid or solid form.

If in liquid form it can be circulated through the plates and pillars of an element of the kind illustrated in FIGURE 4.

The dimensions of the plates may be such that when the element is in position the cooling fluid can flow in the direction of the longitudinal axis of the channel between the edges of said plates and the wall of the cooling channel. Alternatively the fuel element may be laid along one edge of a wall; for example, if one put in a square channel as shown in FIGURE 2a one or two or more elements may be laid along a wall.

I claim:

1. In combination a nuclear reactor fuel element and a channel therefor in a moderator core of a nuclear reactor, a cooling fluid being circulated through the channel and over the surface of said element, the fuel element comprising a plurality of plates each containing nuclear fuel, said plates being held in fixed relation within the channel but spaced apart from each other, the plates being substantially parallel to each other but inclined to the main direction of fluid flow through the channel, each plate being defined by a first pair of opposed edges displaced from one another in the main direction of fluid flow because of the inclination of the plate, and a second pair of opposed edges joining the first pair, each of the first pair of edges extending to the wall of the channel and at least one of the second pair of opposed edges being spaced from the channel wall to permit the flow of cooling fluid between said edge and the channel wall in the direction of the longitudinal axis of the channel and between the plates.

2. A fuel element as claimed in claim 1 in which flow takes place between the plates and the wall of the cooling channel.

3. A fuel element in accordance with claim 1 in which the plates are located in a tube, each plate being attached to the tube.

4. A fuel element as claimed in claim 3 in which the tube is made of graphite.

5. A fuel element in accordance with claim 3 in which the ends of the tube are cut at an oblique angle parallel to the plates.

6. A fuel element as claimed in claim 5 in which the plates fit into slots in the tube and are held in position by wires extending longitudinally of the element.

7. In a nuclear reactor comprising a moderator core having a channel for accommodating a nuclear fuel element, a nuclear fuel element comprising a series of spaced rectangular plates each containing nuclear fuel, said plates being held in fixed relationship to one another by means of two pillars, each of the shorter edges of a plate being fixed to a pillar, the plates being substantially parallel to one another and inclined at an angle to the pillars, the pillars being of channel section and fitting into slots formed in the wall of the moderator core channel, the plates having their edges bent in opposite directions parallel to the pillars so that they can rest on each other and lie parallel to each other in the channel, the uppermost and lowermost plates being joined to the pillars.

8. A fuel element as claimed in claim 7 in which the two pillars of an element are of equal length but displaced from each other in the direction of the axis of the channel to permit uniform spacing of the plates over the length of the channel when several elements are stacked one on the other in a channel.

References Cited in the file of this patent
UNITED STATES PATENTS

| | | |
|---|---|---|
| 1,167,158 | Emmet | Jan. 4, 1916 |
| 2,167,333 | Foss | July 25, 1939 |
| 2,780,596 | Anderson | Feb. 5, 1957 |
| 2,856,340 | Wigner et al. | Oct. 14, 1958 |
| 2,865,826 | Stewart | Dec. 23, 1958 |
| 2,879,216 | Hurwitz et al. | Mar. 24, 1959 |
| 2,885,335 | Moore et al. | May 5, 1959 |

OTHER REFERENCES

TID-7529, Part 1, Reactor Heat Transfer Conference, November 1-2, 1956, pp. 205-212.

NAA-SR-1936, Quarterly Progress Report for January-March 1957. In particular pages 20-21.